Figure 2A:
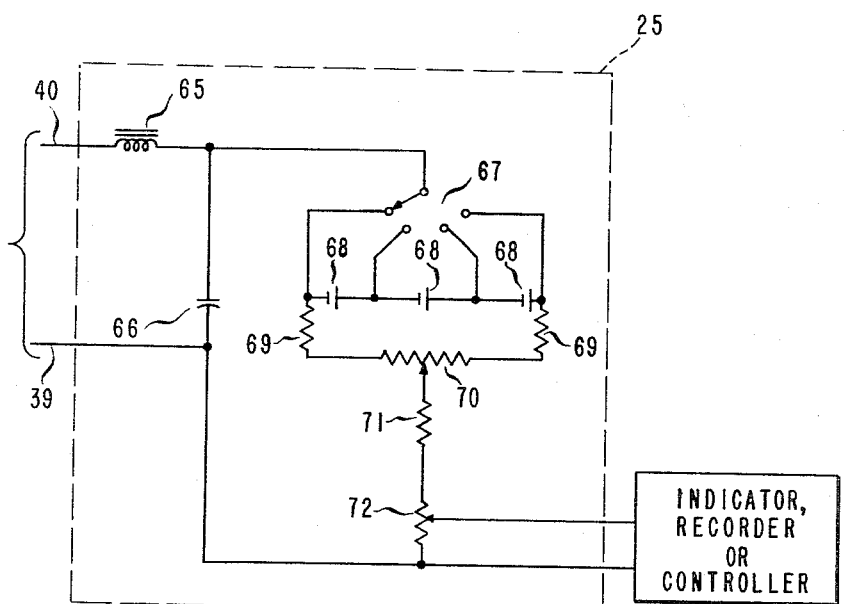

Feb. 28, 1967 L. G. GLASSER ETAL 3,306,156
METHOD AND APPARATUS FOR PHOTOMETRIC ANALYSIS
Filed Feb. 19, 1957 2 Sheets-Sheet 1
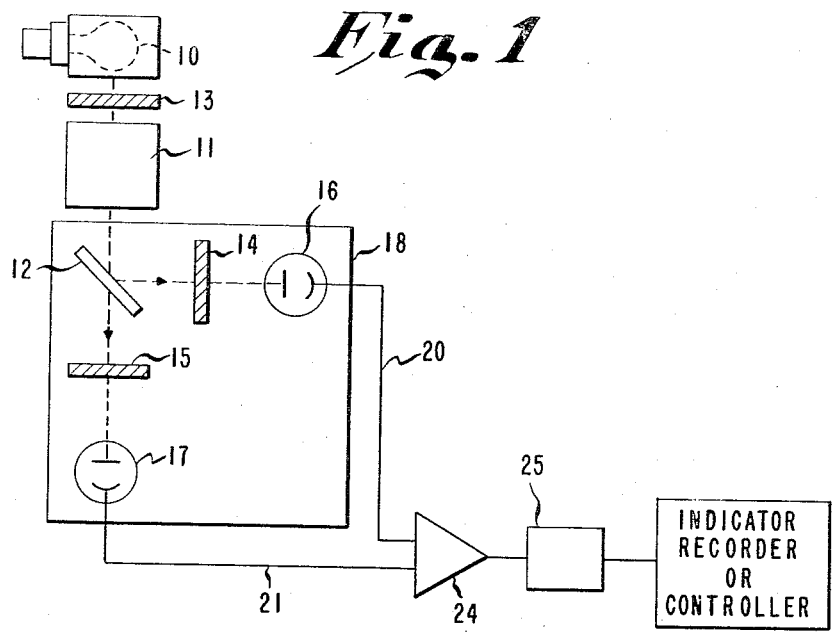
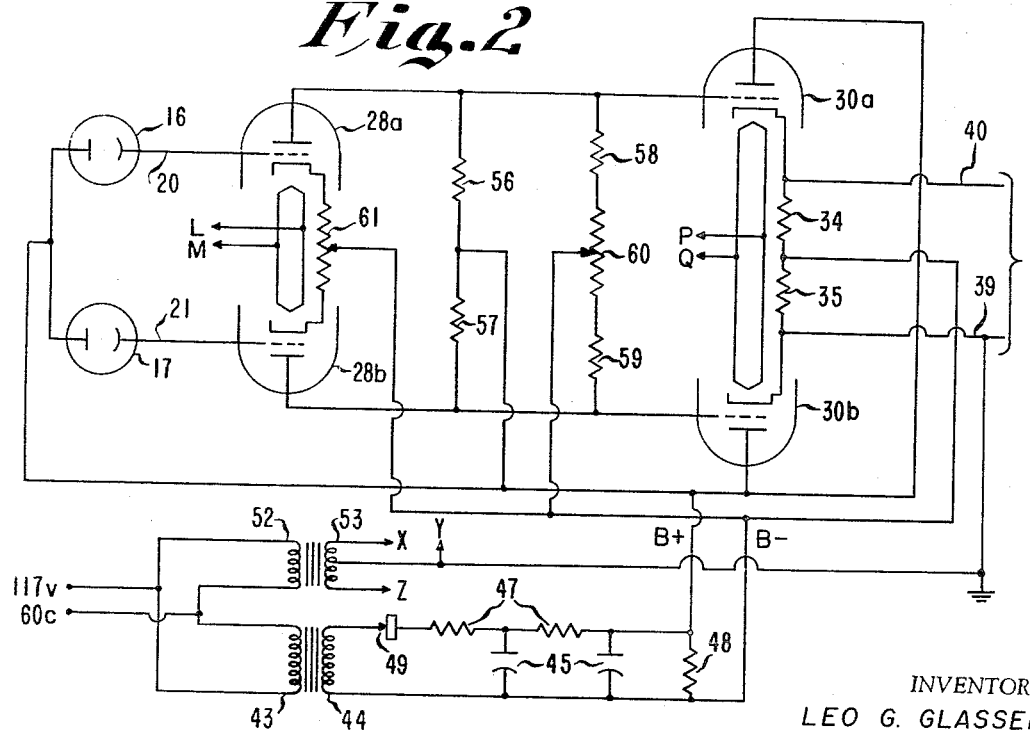
INVENTORS
LEO G. GLASSER
ROBERT J. KANZLER
DANIEL J. TROY
BY Harry J. McCauley
ATTORNEY Feb. 28, 1967     L. G. GLASSER ETAL     3,306,156
METHOD AND APPARATUS FOR PHOTOMETRIC ANALYSIS
Filed Feb. 19, 1957     2 Sheets-Sheet 2

INVENTORS
LEO G. GLASSER
ROBERT J. KANZLER
DANIEL J. TROY

BY Harry J. McCauley
ATTORNEY

United States Patent Office 3,306,156
Patented Feb. 28, 1967

3,306,156
METHOD AND APPARATUS FOR
PHOTOMETRIC ANALYSIS
Leo G. Glasser, Robert J. Kanzler, and Daniel J. Troy, Wilmington, Del., assignors to E. I. du Pont de Nemours and Company, Wilmington, Del., a corporation of Delaware
Filed Feb. 19, 1957, Ser. No. 641,167
5 Claims. (Cl. 88—14)

This invention relates to photometric analysis and particularly to an improved method and apparatus for photometric analysis wherein two different variables characterizing the sample cause radiation absorption to a different extent as regards two different preselected bands of radiation of different wave lengths reflected from or transmitted by the sample, whereby higher accuracy in analysis and a high degree of freedom from the effects of interfering radiation-absorbing or scattering substances which may also be present is obtained.

Photometric analysis, as the term is used herein, consists in the evaluation of a sample on the basis of the intensities of two bands of radiation of different wave length which are transmitted from the sample. As will become apparent hereinafter, there are many situations in the chemical industry wherein materials in process have to be evaluated continuously with a high degree of accuracy and reliability to provide information upon which control operations are based. Industrial analytical equipment must be possessed of high physical strength and substantial immunity from the disturbing effects of vibration, heat, dust, corrosive fumes, and the like, which contribute to spurious signals, and one of the objects of this invention is to meet these demanding requirements. Another very serious problem in the photometric analysis of fluid sample streams is that suspended solids or mists are often present which deposit non-uniformly on the viewing windows of the sample cells, or traverse the space between windows in slugs of greatly differing composition in a manner which varies widely the analyzing radiation flux upon which analysis is based, which results in accompanying spurious signal generation. This characteristic of sample streams is often of such a nature that it is not possible to cure the difficulty by alteration of sample processing techniques but, instead, it is necessary to rely on frequent standardizations with a varying degree of error between successive ones, together with the extra labor involved in standardization operations. Another disadvantage of some existing photometric analyzers is that fluctuations in the intensity of the radiation source vary proportionately the radiation influx to the detectors, resulting in erroneous analyses with random time occurrence which it is impossible to correct for. Also, existing photometric analyzers employ radiation of relatively critical wave length to achieve acceptable accuracy and this can be done only by the use of expensive monochromators or their equivalents, together with the use of precise focusing, which cannot be accomplished without the use of refined optics and mechanical appurtenances. Finally, most photometric analyzers are designed to meet very specific needs and are not adapted to versatile application in a variety of situations, which makes the cost per instrument very high because there can be no volume production under the circumstances.

A principal object of this invention is to provide a method and apparatus for photometric analysis which has such general application that only relatively minor alterations need be made to permit the evaluation of a wide variety of samples. Another object of this invention is to provide an analyzer characterized by exceptionally high accuracy and stability. Another object is to provide a method and apparatus for photometric analysis obviating the use of absolutely monochromatic radiation. Another object of this invention is to enable the use of non-focused radiation in photometric analysis, thereby making it possible to reduce the required precision in alignment of components and to simplify the optical arrangements without sacrificing accuracy.

The manner in which these and other objects of this invention are obtained will become apparent from the following detailed description when read in connection with the accompanying drawings, in which:

FIG. 1 is a schematic representation of an analyzer according to this invention showing the details of the optical system, and FIGS. 2 and 2A together constitute a schematic representation of one electronic amplifying circuit which is adapted for use in conjunction with the analyzer of FIG. 1.

Generally, the objects of this invention are attained by providing a method and apparatus for the photometric analysis of a radiation-absorbing sample wherein intensities of the several wave lengths in the radiation transmitted from the sample are single-valued functions of a first variable and a second variable characteristic of the sample comprising in sequence, dividing radiation transmitted from the sample into a first beam of radiation and a second beam of radiation, regulating the transmissions of the beams of radiation to pass a different band of wave lengths for each of the beams preselected so that the minimum change in the first variable desired to be detected exerts a greater effect on the ratio of the intensity of radiation passed in the first beam to the intensity of radiation passed in the second beam than is exerted by the maximum change in the second variable within the range of analysis, and evaluating the sample with respect to the first variable as a function of the ratio of the intensity of the radiation passed in the first beam to the intensity of the radiation passed in the second beam.

The term "photometric analysis" as hereinafter employed has a wider meaning than the usual connotation, since it is intended to comprehend therein such diverse evaluation procedures as, by way of example solely, the gaging of a transparent or translucent film, the measurement of the fluorescence of solids suspended in liquids, and the determination of the percentage concentration of a particular substance in a mixture with others without regard to whether the materials are in gaseous, liquid or solid phase. These specific determinations are merely representative of the broad application of our invention and are not exclusive of many others which exist now, or may be devised in the future, which can be carried out by our method of analysis.

The term "sample" as hereinafter employed is intended to comprehend that which is the primary subject of interest as regards the determination to be performed, and therefore includes the film, liquid sample, or suspension per se, as the case may be. The sample must be of such a nature that it causes interrelated changes in intensity in the radiation from the sample which are functions of the magnitudes of a first variable and a second variable characteristic of the sample as hereinafter described in detail. The source of the radiation from the sample is of no consequence, except that the radiation transmitted from the sample must be intense enough to actuate the detectors hereinafter described and the ratio of the intensities of the two bands of wave lengths used, as hereinafter described must be substantially constant and independent of fluctuations in the power supply conditions, or in the ambient temperature, and most frequently will be a source of discrete wave lengths such as a mercury vapor lamp or the like.

The conduct of photometric analysis generally is affected by the presence of any substance in optical line between the radiation source and the analyzer and our invention is adapted to rendering analysis of the sample substantially independent of the presence of any anticipated foreign materials which may move into the optical path in random fashion. These foreign materials may vary the transmission of radiation either selectively in terms of wave length, or non-selectively, a typical example of the former being an impurity in an organic sample material which displays a different absorbance for radiation of one wave length of the analytical radiation than for others, while an example of the latter might be dirt or other precipitate depositing on the sample cell windows, smoke drifting across the radiation path or the like. In solid samples, such as strips of film or polymeric blocks, a variation in the radiation from the sample might be caused by the presence of bubbles or other flaws or discontinuities within the sample, or dust or other substance deposited on the exterior surfaces, and the effect is exactly the same as hereinbefore described for foreign materials, in that these are suitably taken account of without introducing error into the analysis.

Understanding of our invention is facilitated by assuming that the "first variable" hereinafter referred to in the description and the claims is the subject of analytical interest, whereas the "second variable," as the term is hereinafter used, is considered as referring to interference generally, which may be optically selective or non-selective, or any environmental changes having an effect on the radiation from the sample, such as random variations in the intensity of the light source, fluctuations in pressure or temperature of the sample, or the like. The second variable may be a function of one or a composite of a multiplicity of individual variables but, so far as analysis according to this invention is concerned, the second variable is, effectively, a unitary quantity.

The radiation from the sample is first split into two beams so that one beam can be allocated primarily to the evaluation of the "first variable" and the other beam primarily to compensation for the effect of the second variable on the first beam. The transmitted radiation passed in each of the two beams is regulated by the interposition of appropriate filters in each of the beams preselected so that the minimum change in the first variable which it is desired to detect exerts a greater effect on the ratio of the intensity of radiation passed in a given one of the beams to the intensity of radiation passed in the other beam than is exerted by the anticipated maximum change in the second variable on this ratio within the range of the analysis. It will be understood that either beam may be reserved for the analysis; however, to be consistent in nomenclature, the beam reserved primarily for the first variable is hereinafter designated the "first beam," whereas the beam reserved primarily for the cancellation or compensation of the second variable is hereinafter designated the "second beam." Since the first variable is the subject of primary analytical interest, the first beam can be thought of, in terms of function, as the "analytical" beam, the second beam being correspondingly the "compensation" beam.

The regulation effected by the filters in the analytical and compensation beams is such that the change in the ratio of the intensities of the radiation transmitted in the two beams is uniquely a measure of the sample characteristic under evaluation, independent of any non-selective interference or environmental changes or any anticipated selective changes which alter the analytical radiation from the sample. This results from the fact that the wave lengths of the beams are selected with the aid of absorption spectral data or routine empirical measurement so that the first variable affects the intensity of the analytical beam in a considerably greater proportion than it affects the intensity of the compensation beam, while at the same time the anticipated selectively-absorbing second variable affects the intensity of both beams in the same proportion within the sensitivity desired for the analysis of the first variable. It will be clear that non-selective interference by its very definition affects both beams in the same proportion and is therefore automatically cancelled from the ratio, so that, after suitable calibration, the analysis is solely that of the isolated factor of interest.

There are two general situations to which this invention is applicable which impose somewhat different criteria for the selection of the filters utilized in the two radiation beams. In each situation appropriate absorptivity v. wave length data must be available for the ingredients of the sample, together with the anticipated range of variation of the fraction or percentage composition of the ingredients as well as the ambient pressure and temperature of the sample during analysis. Having these data, the filters are selected on the following basis: (1) that the first variable which it is desired to measure produces substantially greater changes in fraction of radiation absorbed in the first beam than in the second, so that the ratio of intensities of radiations in the two beams changes measurably with change in the first variable, and (2) that the second variable, throughout its full variation, produces changes so nearly equal in the fraction of radiation absorbed in both beams that the ratio of the intensities of the two beams changes less due to changes in the second variable than the change in this ratio resulting from the smallest change in the first variable to be sensed.

The first situation with which this invention is concerned is that in which the sample is a mixture of a substance the fraction of which is to be determined as the first variable, in mixture with a diluent, which may be one or more other substances absorbing radiation as the remaining fraction of the mixture, which is the second variable. The selection of filters in this instance is made as described for Example 1 hereinafter set forth.

The second situation is that in which the sample is effectively a binary mixture of two light-absorbing substances, the fractional content of each of which varies oppositely with the other, which is subject to environmental changes in temperature or pressure, so that the second variable can be considered to be the quantitative effect of the environmental change solely, since the effect of any variation in the relative content of the two substances making up the mixture is inseparable from the first variable. In this instance the filters are selected exactly as hereinabove described except that, additionally, it is necessary that the filter chosen display a smaller fractional absorbance for the diluent in the first beam than in the second beam, so that the ratio of these fractions in the numerator and denominator of the ratio attributable to the diluent are substantially the reciprocal of the corresponding ratio resulting from environmental change, so that the combined effect cancels out as described for the second general requirement. This technique of environmental compensation is detailed in specific terms in Example 4. It will be understood that limited availability of effective filters and sources capable of sharp wave length selection sometimes restrict compensation for environmental change to finite ranges, but the technique has still proved a very useful one. Also, multiple component mixtures more complex than binary have proved amenable to environmental compensation where the mixtures have behaved essentially the same as binary mixtures within the range of analytical interest.

It is not necessary to the operation of this invention that the analytical or compensation radiation be absolutely monochromatic, and this is an important advantage, since it is impossible in some spectral regions to obtain filters that will restrict the transmission to a narrow band of wave lengths free from a background of substantially wider band. Background radiation leaking through an imperfect filter introduces a relatively small, steady component of radiation into one of the radiation beams, which introduces a corresponding change into the output voltage of the analyzer which appears as a non-linearity in the calibration curve relating the output voltage to the variable measured. The degree of this non-linearity can be minimized by making the sample thickness and wave length selection such that only a small total absorbance is taken in the imperfectly filtered beam, thereby maintaining the proportion of useful radiation to leakage radiation relatively high.

It is also not necessary to the operation of this invention that the radiation in the two beams be precisely focused so long as the two radiation detectors are aligned with respect to mirror 12 hereinafter described in positions such that both detectors view the identical region of the sample. Thus, lateral or axial displacements of the sample which must be carefully avoided in conventional analyzers, due to the serious effect on radiation intensity, can be tolerated with our analyzer, since displacements of either source or sample affect all intensities in the single non-focused beam incident on mirror 12 in the same proportion, making the absolute value of the intensity of no consequence over a wide range due to the fact that a constant intensity ratio is always maintained. This feature is particularly important in the inspection of wide running webs. In a typical case where a traverse of 10 ft. was necessary, the location of the analyzer with respect to the source would have to be maintained to a precision of 0.01″ for a focused optics analyzer, whereas a deviation of as much as ¼″ can be tolerated with the analyzer of this invention without introducing error into the analysis.

The optical system of the analyzer of this invention is adapted for general use without regard to whether the intensities of the wave lengths in the analytical radiation vary in a linear or a non-linear manner. Thus, the optical system is suited to the evaluation of variables following the Lambert-Beer law precisely as well as those which deviate from this relationship to a greater or lesser extent. The detector circuit used in conjunction with the optical system is preferably designed with regard to the output signal required and, a linear output being usually desired, a different circuit is employed where the radiation variance follows an exponential law than where the variance is linear.

Referring to FIG. 1, a preferred embodiment of analyzer optical arrangement according to our invention comprises semi-transparent mirror 12, which may be coated with a semi-transparent evaporated metal film such as that sold under the trademark "Duolux," which receives the analytical radiation transmitted from the sample, indicated generally at 11, and divides the radiation into two separate beams, which are directed to the individual detectors 16 and 17. The radiation paths of the two beams are indicated in broken line representation in the figure. Filter 14 and filter 15 are preselected so as to regulate the transmissions to detectors 16 and 17, respectively, to properly interrelate the wave length bands so that any variation in the ratio of their intensities will be an accurate meausre of the first variable, i.e., the characteristic or component which it is desired to analyze for. The selection of filters 14 and 15 for several specific analyses is detailed in the examples hereinafter set forth. The optical components are mounted in a suitable housing 18.

In general, it is preferred to correlate the ratio of transmissivity to reflectivity of the semi-transparent mirror 12 with the source and with the transmissivity of the filters 14 and 15 so that, in combination, they produce near-equality of intensity of the two bands of radiation reaching the detectors when the sample is in a particular state, commonly, for example, the state corresponding to the average value of the first variable encountered in the analysis. The reason for this selection is that, when so made, both halves of the electrical circuit discussed hereinafter are operating in similar parts of their ranges, and voltage difference due to unbalance is at a minimum, so that drift is minimized. The necessity for this interrelationship of mirror and filters is that: (1) filters in the course of removing radiation of unwanted wave lengths also remove some of the radiation of the desired wave length, and the latter removal is usually different for specific filters, and (2) the intensity ratio of the desired wave lengths in the radiation from the original source is, in general, not unity. In principle this correlation of mirror with filters and source is not difficult, because semi-transparent mirrors are available in various ratios and the spectral energy distribution of sources as well as the transmissivity data for filters are known. In practice compromise is often adequate for the requirements of the specific situation, mirrors of 30% transmission-30% reflection being most commonly used. Furthermore, neutral filters may be employed in either beam to supplement filters 14 and 15 for arriving at intensity balance.

The semi-transparent mirror 12 is a particularly satisfactory and inexpensive beam-splitting device for analyses in the visible and ultraviolet portions of the spectrum, employed in conjunction with a simple unfocused optical system having the advantages already described and with suitable filters which are readily available for a wide variety of wave lengths within these regions of the spectrum. In other spectral regions the availability of desirable filters is much more limited, and it becomes necessary to go to other means of wave length selection. Chief among these other means is the use of grating-type monochromators which, together with appropriate beam collimation and focusing lenses, slits, and mirrors known to those skilled in this art permits the combined operations of splitting of the beam leaving the sample and selection of the bands of wave lengths desired. This latter technique has been used satisfactorily for analyses in the infrared spectrum between 0.5 and 3.0$\mu$, but suffers the disadvantage of much higher initial cost as well as the complexity and precision in mounting of the focused optical system. Other beam-splitting devices and techniques that may be used in this invention include Nicol prisms, Glan-Thompson prisms, and frustrated total reflection and dichroic beam-splitting mirrors, the latter two of which give partial separation by wave length in addition to splitting. All of these require more complex associated optics and, in general, are not preferred except in circumstances where the semi-transparent mirror or the monochromator will not work.

The apparatus of FIG. 1 is shown as analyzing on the basis of transmitted radiation, although in some circumstances the analysis must be conducted with reflected radiation and this can be done equally well. Sample 11 is represented generally as a block, which can be a conventional radiation-transmitting sample cell with glass or quartz windows for a fluid sample, or can be the material in analysis per se, such as a film or polymeric block. The radiation source 10 is preferably a source emitting certain specific wave lengths solely, a type S–4 mercury vapor lamp being useful in many applications in the ultraviolet spectrum. Filter 13, between source 10 and sample 11, is a prescreening filter which may optionally be employed to reduce the number of wave lengths which are retained in the radiation which is passed on to the detectors and, at the same time, reduce the intensity of radiation impinging on sample materials having radiation sensitivity. Detectors 16 and 17 are represented as phototubes, RCA type 935 being satisfactory for many analyses in the visible and ultraviolet spectrum, although the detectors could equally well be electron multiplier phototubes, photoelectromagnetic detectors, such as those of the indium antimonide variety, or others. It is necessary that the detectors have linear current output with respect to radiation intensity, very low dark current and very high impedance as compared with the input impedances of the triodes in the subsequent circuit. Detectors 16 and 17 are connected in electrical circuit with individual channels of dual channel amplifier 24 through leads 20 and 21, respectively, and the signal output from the amplifier, after passing through the regulator 25, is the input for any suitable indicator, recorder or controller represented schematically as a block in FIG. 1.

The specific detector circuit shown in FIG. 2 is especially adapted to produce a linear output for actuation of the indicator, recorder or controller when the first and second variables are exponential functions, such as where radiation variance is in accordance with the Lambert-Beer law, mathematically expressed as:

$$I = I_0 10^{-A} = I_0 10^{-abc}$$

where $I$ = the intensity of the radiation transmitted,
$I_0$ = the intensity of the incident radiation,
$A$ = absorbance of the sample, equal to the product of $a$, $b$ and $c$ as hereinafter defined
$a$ = a constant for the radiation-absorbing material, known as the absorptivity for unit concentration at the wave length of the incident radiation,
$b$ = the length of the sample through which the radiation passes, and
$c$ = the concentration of the radiation-absorbing material.

Inasmuch as $c$, the concentration, is the expression of the mass of absorbing component per unit volume, $c$ is a measure of any of the variables that affect this mass, such as temperature and pressure for compressible substances, as well as the measure of fraction, or percent, of the absorbing component in a mixture. In general, in the practice of this invention all of the variables that affect concentration are held constant except the desired variable, but in certain cases where this cannot be done it is possible automatically to compensate for such unwanted variations, as taught specifically in Example 4.

The circuit of FIG. 2, with which that of FIG. 2A is associated, is designed to receive the exponentially varying output signals of phototubes 16 and 17, extract the logarithms of each, effect a subtraction of the latter, thus effectively performing a ratio measurement, and apply the result, which now varies linearly with concentration or thickness, as the case may be, to the indicator or controller. It will therefore be understood that the circuit of FIG. 2 linearizes the measurement of the variable, which is always highly desirable since results can thereafter be appraised by reference to a linear scale.

Referring to FIG. 2, the output currents of detectors 16 and 17 are supplied through leads 20 and 21, respectively, to the grids of individual triode sections 28a and 28b of a dual triode tube, which may be a conventional type 5692. These triode sections are each operated in a compound sense, in that the cathode-anode voltage of each section is logarithmically related to the current flowing in the associated input circuits constituting detectors 16 and 17 and the individual grids and cathodes, all as described at pp. 40–41 in "Principles of Electron Tubes" by H. J. Reich, published by McGraw-Hill Book Co., New York (1941), and also in the original paper of L. H. Germer, Physical Review 25, p. 795 (1925).

The detector circuit is supplied with power from the transformer having primary winding 43 connected in circuit with an ordinary 117 v., 60 c., A.-C. source and secondary winding 44 connected in series with half-wave rectifier 49 and the filter system including resistors 47 and capacitors 45. Resistor 48 is a loading resistor and the power supply voltage developed across this resistor is typically 85 volts.

The triode circuits of tube sections 28a and 28b are completed by their respective load resistors 56 and 57, typically each of 3 megohms value connected between the respective plates and the positive side of the power supply, and by potentiometer 61 through which the triode circuits are connected to the negative side of the power supply. Potentiometer 61 is typically a 40,000 ohm linear resistor, whose two halves form variable resistors in series with each triode. Its initial setting is chosen to equalize the amounts of power supply noise appearing in the outputs of the triode sections, so that this noise may subsequently be cancelled when the outputs are subtracted. It should be mentioned that although potentiometer 61 is in series with the cathodes of the two triodes, it is without significant effect on the input circuits comprising detectors 16 and 17 and the associated grids and cathodes, since neither the detector current nor the grid-cathode voltage resulting therefrom are affected by the small changes, less than one volt, in the voltage between the triode cathode and detector anode resulting from the very slight adjustment of potentiometer 61.

A resistor network consisting of resistors 58 and 59, each of 2 megohms value, and a linear potentiometer 60 (5 megohms) provide a means for inversely loading the amplifier circuits of triodes 28a and 28b, in order to provide equal output voltage changes for equal changes in the logarithms of the detector currents. Typically, in uses requiring low sensitivity, e.g., 0.5 absorbance full scale or more, neither potentiometer 60 or 61 is critical as to setting and they are left at mid-position. At higher sensitivity, e.g., 0.1 absorbance full scale or less, the potentiometers may require adjustment every 2 or 3 months, or whenever the amplifier tube with sections 28a and 28b is replaced.

The second amplifier stage is of the cathode follower type and can also utilize a type 5692 dual triode tube having individual sections 30a and 30b, the grids of which receive the voltage output from the plates of sections 28a and 28b, respectively. Cathode resistors 34 and 35 typically are 25,000 ohm resistors.

The cathode heater voltages of the two amplifier tubes are conveniently obtained from the second transformer consisting of primary winding 52 and secondary winding 53. The first tube, with sections 28a and 28b, is preferably operated with reduced heater voltage for improved stability as well as operation confined to the logarithmic diode type as hereinbefore described and, accordingly, its heater is connected at L and M to taps X and Y, respectively. Full heater voltage is desirable for triode sections 30a and 30b, and the cathode heaters are here connected at P and Q to transformer taps X and Z, respectively.

Tap Y is grounded and also is electrically connected to lead 39, so that the cathode heater elements of triode sections 28a and 28b are always at a positive D.-C. bias with respect to the cathodes and grids to insure that no thermionic current flows between the exposed parts of the cathode heater elements and either of the grids, thus undesirably affecting the grid-cathode circuit. Typically the value of this D.-C. bias is between +7 and +26 volts, depending on the light intensity falling on detector 17.

The difference signal from the circuit, which is an effective ratio measurement because the difference of the logarithms of two numbers is equal to the logarithm of the ratio of the numbers, is derived from leads 39 and 40 and is of sufficient strength to actuate an indicator or recorder with adjustable range up to about 20 volts D.-C.

In practical operation this circuit can sense changes in the intensity ratio smaller than 0.09% of the ratio, can display as full span changes in the intensity ratio as small as 9% of the ratio (i.e., from 1.0 to 1.09), or larger than 10,000/1 and can operate in any part of the range of ratios from 1/1 to more than 10,000/1. In some carefully controlled laboratory operations the upper range has extended as high as 1,000,000/1. In terms of absorbance difference, the values are as follows:

| | Ratio | Absorbance Difference |
|---|---|---|
| Sensitivity | 0.09% change | 0.0004 change. |
| Full span change, min | 1.09/1 change | 0.04 change. |
| Full span change, max | 1,000/1 change | 4.0. |
| Low limit of range | 1 | 0. |
| High limit of range | 10,000 | 4.0. |

The regulation circuit shown in FIG. 2A is inserted between the output terminals 39 and 40 of the amplifier of FIG. 2 and whatever indicating or recording device is used to obtain the result of the analysis. This regulation circuit serves three purposes, the first being the smoothing of the signal pulsation caused by the alternating light and dark periods of the usual radiation sources, which are extinguished during the low-voltage part of the alternating current cycle, the second being the provision of a bucking voltage, and the third the provision of a sensitivity adjustment. Choke 65 with a typical value of about 70 henries and condenser 66 with a typical value of 2 microfarads together form a filter and provide the smoothing action on the 120 c.p.s. pulsations. The smoothed output from this filter is fed to a 4-point switch 67, across the terminals of which are connected three 1.34-v. mercury primary cells 68, in series-aiding polarity. Across the outer terminals of the mercury cells assemblage are connected in series a resistor 69 of 1,000 ohms, a linear potentiometer 70 of 5,000 ohms, and a second resistor 69 of 1,000 ohms. The three resistors together form a voltage-dividing network, adjustable by movement of the movable tap of potentiometer 70 and by position of switch 67 so that any fraction including zero and either polarity of the voltage of the three cells can be provided either to buck out or add to the signal voltage. Resistor 71, of 20,000 ohms in most applications, and linear potentiometer 72, of 1,000 ohms, complete the circuit between the input signal terminals 39 and 40 and enable the selection and transmission to the output device of a selected fraction of the signal by adjustment of the tap on 72. The output device is shown generally as the block labelled "Recorder, Indicator, or Controller," and may be a commercially available 0–2.5 mv. strip-chart recorder or the like.

The function of the bucking voltage is to enable the cancellation of residual steady signal appearing at the amplifier output terminals. This steady signal represents the unbalance of intensity at the radiation detectors and is due to: (1) the degree of unbalance in radiation associated with source intensity ratio, mirror transmissivity/reflectivity ratio, and filter transmissivity ratio, as hereinbefore described, and (2) the degree of unbalance corresponding to the average value of the first variable. Since the unbalance is relatively steady, its effect is readily compensated by adjustment of switch 67 and/or potentiometer 70 in the calibration steps preceding measurements. The detector circuit of FIGS. 2 and 2A is generally conventional in nature and no novelty is alleged as to the circuit per se.

Some analytical determinations are of a nature wherein the intensities of the radiations transmitted in the analytical beam and the reference beam are linear functions of the first and second variables characteristic of the sample and, in this case, a direct measurement of the linear ratio rather than the logarithm of the ratio is desired. In many practical cases the ratio has been between 1.1 and 1.5, and over this range the logarithm of the ratio is not far from linear and this fact, together with the convenience, stability, and low cost of the electronic circuit shown in FIGS. 2 and 2A, has made it desirable to use this circuit even when the linear ratio is desired. For ratios below about 1.1, the noise level of the circuit of FIGS. 2 and 2A sometimes becomes objectionable and some other ratio-measuring system is therefore preferred. A very satisfactory design of linear ratio-measuring circuit for ratios in the range 1.0 to 1.1 is that taught in U.S. Patent 2,694,335, the only alteration required being the substitution of a high-impedance voltmeter as indicator or recorder for the D.-C. to A.-C. converter connected in circuit with the amplifier.

The analytical method and apparatus of this invention have proved to be very stable and reliable in service and have permitted extremely accurate determinations of individual characteristics of samples completely free from interference over which the analyst has no control whatever. The satisfactory performance is due to the fact that: (1) both detectors view the identical region of sample, light source and complete optical path up to, and including, the beam-splitting mirror 12, so that any extraneous factors affect the light transmitted in the analytical and reference beams in exactly the same proportion and thereby cancel out, and (2) measurement of the sample characteristic of interest is on the basis of the change in ratio of the intensities of radiation transmitted to the detectors, so that analysis is essentially independent of the ambient absolute values of the intensity of the radiation from the sample.

The sensitivity and absorbance range obtainable with this invention are so great that it is commonly possible to carry out analyses not possible with any other known analyzer. There may be mentioned, for examples, operation with a high range of absorbance in order: (a) to minimize the effect of incompletely compensated second variables, such as selective window deposits, which sometimes are encountered because of inadequate filter availability, (b) to make possible the measurement of strong absorbers at an analytical wave length near an absorption peak, where the desired absorption is large compared with the interference, (c) to make possible the measurement of strongly absorbing liquids in cells that are not impracticably thin, and (d) to make possible measurements on strongly absorbing films. Extensive industrial experience with the invention has shown that successful operation is still possible even where more than 99.99% of the radiation from a source is absorbed by the sample.

Analysis according to this invention has a rapid response with a time constant as short as 0.001 sec. in some cases. The analyzer construction is sufficiently rugged so that the optical system can be traversed across the width of running films, and polymeric webs 10 feet in width have been continuously gaged with the apparatus at traversing periods of the order of several seconds to several minutes. Most industrial applications have utilized radiation in the ultraviolet, visible and near-visible infrared range with appropriate optical systems and radiation detectors; however, there are no limitations as regards the wave lengths which may be employed and these are dictated by requirements of the system in analysis. In this connection, we have found that very good results are obtained in photometric analysis wherein the sample absorbs radiation in the wave length range of about 250–1000 m$\mu$.

In addition to the gaging of films in continuous manufacture we have applied our method of analysis to the determination of trace contamination in liquefied gases, the measurement of one component in a molten plastic, and the monitoring of carbon bisulfide vapor in nitrogen gas, and the following examples provide detailed information on filter selection as applied to specific situations sufficient to enable persons skilled in the art to practice our invention for the evaluation of these as well as other systems.

EXAMPLE 1

Here it was desired to measure the concentration of chlorine in dry air with a span of 0–1% chlorine at an accuracy corresponding to a maximum error of ±0.01% chlorine in the presence of a concentration of nitrogen dioxide varying between 0 and 0.05%. The apparatus utilized was that shown in FIGS. 1, 2 and 2A, including a logarithmic amplifier, a transmission type sample cell and a type S–4 mercury vapor lamp as light source. A semi-transparent evaporated metal film such as that sold under the trademark "Duolux" mirror deposited on an ultra-violet transmitting fused silica plate such as that sold under the trademark "Vycor" glass, the composite being 30% reflecting-30% transmitting, was used as beam splitter.

It is known that chlorine absorbs radiation of 334 m$\mu$ very strongly, whereas it does not absorb at 546 m$\mu$. The light source is known to emit radiation of both 334 m$\mu$ and 546 m$\mu$ wavelength and we have found that we can transmit 334 m$\mu$ radiation in our analytical beam by using the following composite filter, which corresponds to filter 14, FIG. 1: 2 pieces of Corning CS7-54 (9863) glass together with a 1 cm. long quartz cell containing a solution consisting of 20 g. of cerium nitrate (CeNO₃.6H₂O) in 250 ml. of distilled water (prepared by first boiling and then cooling out of contact with air in a nearly full glass-stoppered bottle) to which was added 170 g. of nickelous sulfate (NiSO₄.6H₂O), stirred to dissolve completely. Radiation of 546 m$\mu$ wavelength is obtained by use of a composite filter consisting of 1 piece of Corning CS3-69 (3486) glass together with 1 piece of Corning CS1-60 (5120) glass.

Where the component analyzed for is denoted $x$ (in this example chlorine), the full-scale absorbance, $A_{px}$, is chosen as unity and the absorptivity $a$ of chlorine at the chosen analytical wave length, $p$, is denoted $a_{px}$ (obtained from the literature as 65.5 liter/mol.-cm. for 334 m$\mu$ radiation), while the lower limiting concentration of the chlorine to be measured is denoted $c_x$, the sample cell length $b$ required for the sensitivity desired is:

$$b = \frac{A_{px}}{a_{px}c_x} = \frac{1 \times 24.5}{65.5 \times 0.01} = 37.9 \text{ cm.}$$

the factor 24.5 being the gm. mol. volume at 25° C., 760 mm. Hg.

It is next necessary to determine what effect a variation in $y$, in this example nitrogen dioxide, of ±0.025% concentration will have knowing, from the literature, that the absorptivity $a_{py}$ at the analytical wave length is 221 liter/mol.-cm. for 334 m$\mu$ and that the absorptivity is zero for 546 m$\mu$ radiation. The absorbance change can be denoted $\pm\Delta A$ and is determined for the maximum variation of nitrogen dioxide $c_y$ occurring, which is 0.025%. Accordingly, $$\pm\Delta A = a_{py}bc_y = \pm 221 \times 37.9 \times 0.025$$
$$\times 0.01 \times 1/24.5 = \pm 0.086$$

At $A_{px}=1.0$ full scale for the span 0–1% chlorine the interference effect attributable to $NO_2$ is thus $$\pm 0.086/1 \times 1\% = \pm 0.09\%$$

chlorine approximately, which is nine times the allowable maximum error of ±0.01% which can be tolerated. Thus, the selection of wavelengths made without regard to the interference contributed by the nitrogen dioxide introduces excessive error into the determination.

Employing the principles underlying our invention it is apparent that the two wavelengths should be chosen to give an appreciable difference in absorptivity towards chlorine and a difference in absorptivity towards nitrogen dioxide so small that the extreme variation in nitrogen dioxide content affects the absorbance less than the absorbance change equivalent to the desired sensitivity in terms of chlorine. These requirements are met rather closely by the following wavelengths available from the S-4 mercury vapor lamp, which display the tabulated absorptivities in liters/mol.-cm.:

|  | 365 m$\mu$ | 436 m$\mu$ |
|---|---|---|
| Chlorine | 25.17 | 1.636 |
| Nitrogen dioxide | 318 | 327 |

These wavelengths are obtainable for 365 m$\mu$ by use of a composite filter made up of 1 piece of Corning CS0-52 (7380) together with 2 pieces of Corning CS7-37 (5860), and for 436 m$\mu$ by a composite filter consisting of 2 pieces of Corning CS3-73 (3389) together with 1 piece of Corning CS5-58 (5113).

Again assuming a full-scale absorbance of 1.0, the cell length can be calculated as:

$$b = \frac{A_x}{a_{px}c_x} = \frac{1 \times 24.5}{(25.17-1.636) \times 0.01} = 104 \text{ cm.}$$

Similarly, $$\pm\Delta A_y = (318-327) \times 108 \times \pm 0.025$$
$$\times 0.01 \times 1/24.5 = \pm 0.010,$$

which is equivalent to ±0.01/1×1% = ±0.01% chlorine.

It will be seen that the interference resulting from the presence of nitrogen dioxide has been reduced ninefold over the previous selection of filters and that the magnitude is now within the allowable error, therefore the new choice of wave lengths is entirely satisfactory for the purposes.

In this example, inasmuch as the filters in both beams are solid pieces of glass, and a 30% reflecting-30% transmitting mirror was used, it is immaterial which beam is chosen as analytical. Had the first selection of wave lengths been satisfactory, it would have been desirable to place the liquid filter in a position so that bubbles could disengage and float out of the beam. In conventional applications, the baseplate of the apparatus of FIG. 1 is vertical, so that the preferred position for the liquid filter would have been in the reflected beam at position 14.

EXAMPLE 2

This example involved measuring the weight/unit area of nitrocellulose coating applied as a waterproofing agent in an amount which might vary from near zero to 5 g./sq. m. to cellophane which was 0.001″ thick. It was desired to measure the coating weight to ±1% of its value, or ±0.05 g./sq. m., despite possible variations in thickness of the cellophane base of ±5% of its value, equivalent to ±0.0005″ in thickness. A mercury vapor lamp, type G4-T4 was employed as the source and the detector circuit incorporated a logarithmic amplifier of the design of FIG. 2 and regulator as shown in FIG. 2A.

Since the gage of the cellophane was essentially constant the absorbance variation due to change in gage was small, and the result was that there was substantially constant transmission by the cellophane per se, which resulted in a steady voltage component in the signal. A proper setting of the adjustable voltage source of FIG. 2A bucked out the signal due to the cellophane base and permitted the signal due to the nitrocellulose coating to occupy the full width of the recorder, which was a commercially available 0–2.5 mv. strip chart recorder having a uniformly divided chart.

The wavelengths selected in this case were 254 m$\mu$ and 365 m$\mu$, which displayed the following absorbances for 0.001″ thick cellophane and for the equivalent of 5 g./sq. m. of nitrocellulose coating:

|  | 254 m$\mu$ | 365 m$\mu$ |
|---|---|---|
| Cellophane, 0.001″ thickness | 0.16 | 0.04 |
| Coating, 5 g./sq. m. | 1.30 | 0.00 |

These wavelengths were obtained, in the case of the 254 m$\mu$ beam, by utilizing a composite filter made up of 1 quartz cell, 2 cm. thick, containing chlorine gas at 1 atmosphere pressure, 1 quartz cell, 1 cm. thick, containing aqueous nickel sulfate solution in the concentration 500 g. NiSO₄.6H₂O/liter of distilled, air-free water, and one piece of Corning filter #9863 polished, and, for the 365 m$\mu$ beam, by utilizing a composite filter made up of one piece of Corning #5860 polished together with one piece of Corning filter #7380 polished.

The beam-splitting mirror 12 for this apparatus was of the same type as that described for Example 1, 30% reflecting-30% transmitting.

For the reasons set forth in Example 1, the liquid filter would be located in position 14 of FIG. 1.

With the above choice of wave lengths, the effects of base thickness variations on the coating weight measurement are minimized. The effect of the maximum variation in cellophane base thickness, ±5% of the thickness, produces an absorbance difference of 0.05

(0.16−0.04)=0.006, but this is equivalent to a coating weight variation of only ±0.006/1.3−0×5 g./sq. m.= ±0.023 g./sq. m., or less than ±½ of 1% of the nominal coating weight. This more than meets the analysis requirements.

EXAMPLE 3

Here it was desired to measure to a precision of ±0.5% phosgene the amount of phosgene in a mixture with hydrogen chloride gas containing traces of water vapor that create a mist. The phosgene content varied over the range of 0–50%, depending on process conditions. The phosgene content, together with a total gas flow measurement, was used to control the flow of an associated stream of process materials to a subsequent reactor and the sample stream for the analyzer was available at 1 atm. and 25° C.

A G4-T4 mercury vapor lamp was employed as the source and the transmission cell had windows of Corning type 7910 glass, 2 mm. thick, spaced apart for a sample length of 1.0″. On the basis of relative absorbances the analytical beam wave length was chosen at 254 m$\mu$ whereas the reference beam was chosen at 313 m$\mu$. Hydrogen chloride is transparent at both these wavelengths while the absorptivity of phosgene is 17 and zero l./mol.-cm. respectively. The full scale absorbance for 0–50% phosgene with a 1.0 in. sample cell is then $$\Delta A_x = \Delta a_x b c_x = (17-0) \times 1.0 \times 2.54 \times 0.5 \times 1/24.5 = 0.88.$$

At this absorbance span, measurement to ±1% of full-scale, or ±0.5% phosgene is readily achieved. To simplify filter selection for the analytical and reference beams a prefilter 13 (refer FIG. 1) was utilized, this being a composite of 1 quartz cell, 1 cm. thick, containing nickel sulfate in solution in air-free distilled water in the concentration of 500 g. $NiSO_4 \cdot 6H_2O$/liter together with one piece of Corning glass #9863 polished.

The reference beam transmitted by the mirror 12, which was a clear ultraviolet transmitting fused silica plate glass, was regulated to pass 313 m$\mu$ wave length radiation by interposition of a single piece of Corning glass #7740, whereas the analytical beam reflected from the mirror was regulated to 254 m$\mu$ by interposition of a quartz cell 2 cm. thick containing chlorine gas at 1 atm. pressure.

The detector circuit was of the logarithmic amplifier type as shown in FIG. 2 and utilized a simple adjustable voltage divider as shown in FIG. 2A, which fed a commercially available controller and miniature strip-chart recorder provided with a conventional D.-C. to A.-C. converter.

Because of the liquid prefilter in position 13 of FIG. 1, the whole apparatus was turned 90° in order to make the beam from the source to the mirror take a horizontal course and thereby allow bubbles in filter 13 to float out of the radiation beam.

EXAMPLE 4

This example teaches the technique for obtaining compensation for interference due to changes in environmental conditions as well as for the presence of substances other than the substance of primary analytical interest, such as pressure differences resulting in changes in the number of molecules interposed across the analytical radiation beam which cause accompanying changes in absorbance and, therefore, spurious signal output. The compensation in this case is accomplished by deliberately proportioning the interference occasioned by the second variable so as to offset, to a substantial extent at least, the interference caused in the determination of the first variable by changes in such environmental factors affecting both of the variables together as pressure and temperature. Compensation of this nature is possible for binary systems, or for systems which behave like binary systems in the respect that components other than the one to be measured exist in constant ratio one to another over the full range of the analysis.

The mathematical basis for the compensation of this invention can be elaborated briefly by the following equations. At the outset it can be shown that measurement in the practice of this invention is according to the following general equaion for the most complicated case, i.e., where a logarithmic amplifier is employed:

$$\Delta E = K_1 + K_2[bc_x \Delta a_x + bc_y \Delta a_y]$$

in which $\Delta E$ is the output voltage of the logarthmic amplifier, $b$ is the length of the sample cell, cm., $c_x$ and $c_y$ are the volumetric concentrations in g. mol./liter for components $x$ and $y$, respectively, $\Delta a_x$, $\Delta a_y$ are the absorptivity differences between the two wavelengths selected for the components of the binary systems $x$ and $y$, respectively, in liters/(g. mol.)cm., and $K_1$ and $K_2$ are constants incorporating such system characteristics as the phototube sensitivities at the chosen wavelengths, the fraction of radiation lost at mirrors and filters, the proportionality factor of the amplifier and the like.

If $f_x$ represents the mol fraction of component $x$ in the binary system and $f_y = 1 - f_x$ represents the mol fraction of component $y$ in the binary system, the following equations can be written for a temperature of 25° C., at which the gm. molecular volume is 24.5 liters:

$$c_x = f_x \times 1/24.5 \times 298 \frac{P}{T} = f_x \times K_3 \frac{P}{T}$$

and $$c_y = f_y \times 1/24.5 \times 298 \frac{P}{T} = (1-f_x) \times K_3 \frac{P}{T}$$

where

P and T represent the absolute pressure and temperature, respectively, and $K_3$ is a constant, equal to 298/24.5.

Substituting the foregoing values of $c_x$ and $c_y$ into the general equation and introducing $K_4$ as the product of $K_2$ and $K_3$:

$$\Delta E = K_1 + \frac{P}{T} K_4 b [f_x \Delta a_x + (1-f_x) \Delta a_y]$$

Generally, interference compensation for the presence of component $y$ according to this invention has been effected by choosing the radiation wavelengths so that the quantity $(1-f_x)\Delta a_y$ remained negligible but, for compensation for environmental interference, it is additionally necessary to operate so that the interference as regards component $x$ resulting from environmental condition change is exactly counterbalanced by the corresponding change as regards component $y$. This can be expressed mathematically by the equation:

$$b f_x' \Delta a_x = -b(1-f_x')\Delta a_y$$

where $f_x'$ is the particular concentration of component $x$ at which perfect compensation is required. The calculated value of $\Delta a_y$ in terms of $f_x'$ is, accordingly, $$f_x' \Delta a_x / (1-f_x')$$

and this value is substituted in the general equation, which now becomes:

$$\Delta E = K_1 + \frac{P}{T} K_4 b \Delta a_x \left[ f_x - (1-f_x) \frac{f_x'}{1-f_x'} \right]$$

It is clear from this equation that, if $f_x = f_x'$, the quantity in the bracket becomes zero, and $P/T$ exerts no effect on the analysis. Furthermore, at values of $f_x$ small in comparison with $(1-f_x)$ the effect of P and T is essentially proportional to the deviation of $f_x$ from $f_x'$, because $(1-f_x)$ is nearly equal to $(1-f_x')$, whereas in the uncompensated case the effect is proportional to the full magnitude of $f_x$.

In this instance it was desired to analyze for the $SO_2$ content in a mixture of chlorine and sulfur dioxide in the range from 14% to 16% SO₂, full scale, using the suppressed zero technique. The total sample absorbance chosen was approximately 1.0 in order to supply ample signal to the logarithmic amplifier, which was employed, while minimizing the relative effects of any radiation wavelengths leaking past the filters other than those preselected. The splitting mirror was a 30% reflection-30% transmission type such as that described for Example 1. The analytical accuracy desired was ±¼% SO₂ where the temperature was maintained at 25° C. but the pressure in the analytical cell varied from 1.0 to 1.1 atmosphere absolute.

The radiation wave lengths chosen for this analysis were 302 m$\mu$ and 334 m$\mu$, which were both emitted from the S–4 mercury vapor light source. The filter for the 302 m$\mu$ wavelength was a commercially available ultraviolet interference filter, whereas the filter for the 334 m$\mu$ wavelength was a 1 cm. quartz cell containing a solution consisting of 20 g. CeNO₃.6H₂O, 170 g. NiSO₄.6H₂O, and 250 ml. of air-free distilled water.

The absorptivities of the chosen wavelengths in l./(g.-mol.)(cm.) were as follows:

|            | 334 m$\mu$ | 302 m$\mu$ |
|------------|------------|------------|
| $a_{SO_2}$ | 3          | 190        |
| $a_{Cl_2}$ | 65.5       | 35.2       |

With these absorptivities the percentage of SO₂ at which pressure compensation is complete is calculated from the equation:

$$bf_x' \Delta a_x = -b(1-f_x') \Delta a_y \text{ or } \frac{f_x'}{(1-f_x')} = \frac{\Delta a_y}{\Delta a_x} = \frac{35.2-65.5}{190-3}$$

from which $f_x' = 0.139$ or 13.9%. While this value is slightly below the desired range of analysis of 14–16% it is settled on as a compromise.

For either wavelength the total sample absorbance can be calculated as $$A = a_x b c_x + a_y b c_y$$
$$= a_x b f_x \times \frac{1}{24.5} + a_y b (1-f_x) \frac{1}{24.5}$$

With the total sample absorbance selected as 1.0, for 302 m$\mu$ $$1.0 = 190 \times b \times 0.16 \times \frac{1}{24.5} + 35.2 \times b(0.84) \times \frac{1}{24.5}$$

from which $b = 0.408$ cm.

Similarly, for 334 m$\mu$ radiation, $$b = \frac{1.0 \times 24.5}{3 \times 0.16 + 65.5 \times 0.84} = 0.44 \text{ cm.}$$

The maximum cell length chosen is therefore 0.4 cm., which it appears will give total sample absorbance of about 1.0 in each beam.

The change in absorbance ΔA for full scale change in SO₂ concentration is next calculated from the expression:

$$\Delta A = \Delta a_x b \Delta c_x + \Delta a_y b \Delta c_y, \text{ where } \Delta c_x = \frac{\Delta f_x}{24.5}$$

and $\Delta f_x = -\Delta f_y$, since, in a binary mixture a mol fraction increase in one component is accompanied by an equal mol fraction decrease in the other component. Accordingly, $$\Delta A = \frac{1}{24.5}[\Delta a_x b \Delta f_x - \Delta a_y b \Delta f_x] = \frac{\Delta f_x b}{24.5}[\Delta a_x - \Delta a_y]$$

$\Delta a_x = 190 - 3 = 187$ and $\Delta a_y = -65.5 + 35.2 = -30.3$ from which $$\Delta A = \frac{0.02 \times 0.4}{24.5}[187 - (-30.3)] = 0.071 \text{ approx.}$$

This is a sufficient change in absorbance to provide a concentration signal of magnitude which can be discriminated from the noise level, and it is therefore concluded that the choice of wavelengths is a good one.

The effect of pressure increase from 1 to 1.1 atmospheres will be to increase the total absorbance from 1.0 to 1.1, or about 10%. The scale span chosen from the calculations is 16.0 − 13.9% = 2.1%, whereupon the extreme error is $$2.1 \times \frac{1.1}{1} - 2.1 = 0.21\% \text{ SO}_2$$

which is equivalent to a ±0.10% variation in SO₂ and which is thus well within the limit of analytical accuracy of ±¼% SO₂ sought.

From the foregoing it will be apparent that this invention is capable of relatively wide modification within the skill of the art without departure from its essential spirit, and it is therefore intended to be limited only by the scope of the following claims.

What is claimed is:

1. An analyzer for the photometric analysis of a sample on the basis of radiation transmitted from said sample wherein intensities of the several wave lengths in said radiation are single-valued functions of a first variable and a second variable characteristic of said sample comprising in combination beam-splitting means adapted to receive and divide radiation from a specific region of said sample into two separate beams, one of which beams is passed through a first filter to a first radiation detector and the other of which beams is passed through a second filter to a second radiation detector, both detectors being disposed with respect to said beam-splitting means so that each said radiation detector views the identical area of said specific region, said first filter and said second filter being preselected to pass narrow bands of wave lengths in each of said beams so that the minimum change in said first variable desired to be detected exerts a greater effect on the ratio of the intensity of radiation passed in said first beam to the intensity of radiation passed in said second beam than is exerted by the anticipated maximum change in said second variable within the range of analysis, and a ratio-measuring electrical circuit connected to the output sides of said radiation detectors.

2. A photometric analyzer according to claim 1 wherein said ratio-measuring electrical circuit comprises a dual logarithmic amplifier and a linear indicator responsive to said logarithmic amplifier.

3. A method of photometric analysis of a radiation-absorbing sample wherein intensities of the several wave lengths in the radiation transmitted from the sample are single-valued functions of a first variable and a second variable characteristic of said sample comprising in sequence dividing radiation transmitted from said sample into a first beam of radiation and a second beam of radiation, filtering each said beam of radiation to transmit a different band of wave lengths for each said beam chosen so that the minimum change in said first variable desired to be detected exerts a greater effect on the ratio of the intensity of radiation transmitted in said first beam to the intensity of radiation transmitted in said second beam than is exerted by the maximum change in said second variable within the range of analysis, and electrically measuring the ratio of the intensity of the radiation transmitted in said first beam to the intensity of the radiation transmitted in said second beam together with a measurement of said first variable as a function of said ratio.

4. A method of photometric analysis of a sample consisting of a binary mixture of a first radiation-absorbing component the determination of which is desired and a second radiation-absorbing component present as a diluent wherein intensities of the several wave lengths transmitted from the sample are single-valued functions of a first variable constituting the fraction of said first radiation-absorbing component present in said sample and a second variable constituting changes in concentration of said first radiation-absorbing component resulting from changes in the pressure and temperature to which said sample is exposed comprising in sequence dividing radiation transmitted from said sample into a first beam of radiation and a second beam of radiation, filtering each said beam of radiation to transmit a different band of wave lengths for each said beam chosen so that the minimum change in said first variable desired to be detected exerts a greater effect on the ratio of the intensity of radiation transmitted in said first beam to the intensity of radiation transmitted in said second beam than is exerted by the maximum change in said second variable within the range of analysis, and electrically measuring the ratio of the intensity of the radiation transmitted in said first beam to the intensity of the radiation transmitted in said second beam together with a measurement of said first variable as a function of said ratio.

5. A method of photometric analysis of a radiation-absorbing sample consisting substantially entirely of a mixture of phosgene and hydrogen chloride by the transmission of a beam of radiation containing discrete ultraviolet wave lengths through said sample comprising in sequence dividing radiation transmitted from said sample into a first beam of radiation and a second beam of radiation, filtering said first beam to transmit a narrow band of wave lengths strongly absorbed by phosgene and substantially less strongly absorbed by hydrogen chloride than by phosgene, filtering said second beam to transmit a narrow band of wave lengths only weakly absorbed by phosgene but absorbed by hydrogen chloride in substantially the same proportion to the total radiation in said second beam as the absorption of said hydrogen chloride for the radiation of said first beam bears to the total radiation in said first beam, and electrically measuring the ratio of the intensity of the radiation transmitted in said first beam to the intensity of the radiation transmitted in said second beam together with a measurement of the content of phosgene in said sample as a function of said ratio.

References Cited by the Examiner
UNITED STATES PATENTS

| | | | |
|---|---|---|---|
| 2,503,165 | 4/1950 | Meyer | 88—14 X |
| 2,620,444 | 12/1952 | Heigl et al. | 88—14 X |
| 2,679,185 | 5/1954 | Atwood. | |
| 2,694,335 | 11/1954 | Albright et al. | 88—14 |
| 2,703,844 | 3/1955 | Miller | 88—14 X |
| 2,718,597 | 9/1955 | Heigl et al. | 250—43.5 |
| 2,737,591 | 3/1956 | Wright et al. | 88—14 X |
| 2,775,160 | 12/1956 | Foskett et al. | 88—14 |
| 2,823,800 | 2/1958 | Bliss. | |
| 2,849,618 | 8/1958 | Smith | 250—43.5 |
| 2,987,182 | 6/1961 | Ator et al. | 88—14.2 X |

OTHER REFERENCES

Fastie and Pfund: "Selective Infra-Red Gas Analyzers," Journal of the Optical Society of America, vol. 37, No. 10 (October 1947), pp. 762–768. (Page 767 relied on.)

JEWELL H. PEDERSEN, *Primary Examiner.*

JOSEPH E. GONSALVES, EMIL G. ANDERSON, WILLIAM MISIEK, FREDERICK M. STRADER,
*Examiners.*

J. K. CORBIN, C. S. KOENIG, W. L. WILLIAMSON,
*Assistant Examiners.*